US011225991B2

(12) United States Patent
Hall et al.

(10) Patent No.: US 11,225,991 B2
(45) Date of Patent: Jan. 18, 2022

(54) SYSTEMS AND DEVICES FOR RELEASABLY SECURING OBJECTS

(71) Applicant: Hall Labs LLC, Provo, UT (US)

(72) Inventors: David R. Hall, Provo, UT (US); Jerome Miles, Provo, UT (US); Jeffrey Knighton, Provo, UT (US)

(73) Assignee: Hall Labs LLC, Provo, UT (US)

(*) Notice: Subject to any disclaimer, the term of this patent is extended or adjusted under 35 U.S.C. 154(b) by 109 days.

(21) Appl. No.: 16/819,524

(22) Filed: Mar. 16, 2020

(65) Prior Publication Data

US 2021/0285479 A1 Sep. 16, 2021

(51) Int. Cl.
*F16B 21/04* (2006.01)
*F16B 7/04* (2006.01)

(52) U.S. Cl.
CPC .................. *F16B 7/0413* (2013.01)

(58) Field of Classification Search
CPC ........ F16B 21/02; F16B 21/04; F16B 7/0413; F16B 5/10; F16B 5/0092; Y10T 403/7007
See application file for complete search history.

(56) References Cited

U.S. PATENT DOCUMENTS

| 3,211,479 A | * | 10/1965 | Brown | ................ | E21B 23/006 |
| | | | | | 285/360 |
| 8,057,121 B2 | * | 11/2011 | Gallagher | ............... | F16B 21/04 |
| | | | | | 403/318 |
| 2014/0105679 A1 | * | 4/2014 | Oliver | .................... | F16B 21/04 |
| | | | | | 403/348 |

* cited by examiner

*Primary Examiner* — Daniel J Wiley (57) ABSTRACT

Devices and system for releasably securing objects are disclosed. An insert with tabs around a perimeter is inserted into a receiver. The tabs follow inlet grooves and tab capture grooves, and then retract into tab resting depressions, securing the insert and receiver while force is maintained between the insert and the receiver. The force is removed and the tabs exit the tab resting depressions into the tab release groove. Application of the force again causes the tabs to enter into an outlet groove and out of the receiver, thus detaching the insert and the receiver. The device is preferably used in a system for raising a lowering a rectangular platform with a device at each corner of the platform.

19 Claims, 8 Drawing Sheets

SYSTEMS AND DEVICES FOR RELEASABLY SECURING OBJECTS

TECHNICAL FIELD

The systems and devices described herein relate generally to releasably securing objects.

BACKGROUND

Attaching cables to each other, or cables to loads, or any object to another object, is a common activity in industry and in daily life. For example, moving heavy equipment into place often requires cranes that pick up and carry the object to another location. In some instances, the new location is a location that is hazardous, dangerous, or difficult for a person to access. The ability to releasably secure objects, both by a person and without a person present, would be beneficial.

SUMMARY

In a first aspect, the disclosure provides a device for releasably securing a first object and a second object. An insert has a first end that is attachable to the first object. A second end of the insert is generally cylindrical and has at least two tabs extending radially. A receiver has a first end that is attachable to the second object. A second end has a cavity for receiving the insert. The cavity consists of a generally cylindrical wall, the wall having a groove for receiving the at least two tabs. The groove has at least two tab access portions, open toward the second end of the receiver. The tabs enter the groove by the two tab access portions as the insert and the receiver are brought together by relative movement in a first linear direction. The groove has at least two first inclined portions, each first inclined portion adjacent on one end to a tab access portion and adjacent on an other end to a tab capture portion. As the insert or the receiver is moved in the first linear direction, tabs riding in one of the first inclined portions cause a first step of relative rotation between the receiver and the insert in an angular direction. As a result of the first step of relative motion, the tabs having entered the groove through the tab access portion are moved adjacent to the tab capture portions, to thereby secure the first and second objects. The groove has at least two tab capture portions. As the insert or the receiver is moved in a second and opposite linear direction, each tab is caused to take a second step of relative rotation between the receiver and the insert in the angular direction, whereby, as a result of the second step of relative motion the tabs are aligned with a second inclined portion and are captured in a tab capture portion to prevent the insert and receiver from separating. Each of the tab capture portions is separated by one of the at least two tab access portions. The groove has at least two second inclined portions. Each second inclined portion is adjacent on one end to a tab capture portion and adjacent on an other end to a tab access portion. As the insert or the receiver is moved again in the first linear direction, each tab rides in one of the second inclined portions and causes a second step of relative rotation between the receiver and the insert in the angular direction. As a result of the second step of relative motion, the tabs are moved out of the tab capture portions to the tab access portions, to thereby release the first and second objects upon relative movement between the insert and the receiver in the second linear direction.

In a second aspect, the invention is a system for raising and lowering a load. The system includes an insert with a first end configured to attach to the load or a line, a generally cylindrical second end comprising at least two tabs extending radially from the second end, and a first magnet. The system also includes a receiver with a first end configured to attach to the load or the line and a second end comprising a cavity configured to receive the insert, the cavity comprising a generally cylindrical wall, the wall comprising a groove configured to receive the tabs. The receiver also includes a second magnet adjacent to the cavity that attracts the first magnet. The groove includes at least two tab access portions, open toward the second end of the receiver, whereby the tabs enter the groove as the insert and the receiver are brought together by relative movement in a first linear direction caused by the attraction between the first magnet and the second magnet. The groove also includes at least two first inclined portions, each first inclined portion adjacent on one end to a tab access portion and adjacent on an other end to a tab capture portion, whereby, as the insert and the receiver are brought together by relative movement in the first linear direction, tabs riding in one of the first inclined portions cause a first step of relative rotation between the receiver and the insert in an angular direction, and whereby, as a result of the first step of relative rotation, the tabs having entered the groove through the tab access portion are moved adjacent to the tab capture portions, to thereby secure the first and second objects. This same groove further includes at least two tab capture portions comprising at least two second inclined portions, whereby as the insert and the receiver are moved apart by relative movement in a second and opposite linear direction by the lifting device pulling the line, each tab is caused to take a second step of relative rotation between the receiver and the insert in the angular direction along the second inclined portion, whereby, as a result of the second step of relative rotation, the tabs are aligned with a second inclined portion and are captured in a tab capture portion, the tab capture portion preventing the insert and receiver from separating, wherein each of the tab capture portions is separated by one of the at least two tab access portions. Finally, the groove includes at least two third inclined portions, each third inclined portion adjacent on one end to a tab capture portion and adjacent on an other end to a tab access portion, whereby as the insert and the receiver are moved by relative movement in the first linear direction by the lifting device releasing tension on the line and the first magnet and the second magnet pulling the insert and the receiver together, each tab rides in one of the second inclined portions and causes a third step of relative rotation between the receiver and the insert in the angular direction, and whereby as a result of the third step of relative motion, the tabs are moved out of the tab capture portions to the tab access portions, to thereby release the load upon again moving the receiver in the second linear direction by the lifting device pulling on the insert or the receiver. In this system, the at least two tabs are radially spaced on the second end of the insert so as to simultaneously line up with either tab access portions or tab capture portions. Also, the line is attached to a lifting device. The lifting device is configured to lower the line to the point where the receiver is aligned with the insert and a connection is made therebetween, and to raise the line once the connection is made.

The device is preferably used in a system for raising a lowering a rectangular platform ad has a device at each corner of the platform. This is accomplished with four inserts, four receivers, four lines and four lifters, each associated with one of the four corners of the platform.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Attachment of objects is required in industry and daily life. The present invention discloses devices and systems for releasably securing objects to one another by means of an insert with tabs that fit into grooves inside a receiver. The releasable nature of the invention arises from the way that the insert and the receiver interact. A preferred embodiment entails lifting loads or objects, for example to an overhead storage position. In the most preferred embodiment, the devices are used to attach and detach platforms, appliances or pieces of furniture to raise and lower those items to facilitate a reconfigurable commercial and/or residential space.

The load is attached to the insert and the lifting device, such as a winch, is attached by a line to the receiver. Both the insert and the receiver preferably have magnets that attract each other. Preferably, the attraction of the magnets, combined with intelligent lifters allows for the attachment and detachment without human intervention.

As the tabs enter the groove, drawn in by the magnetic force, they run into a slope that pushes the tabs rotationally, causing the tabs to align with a depression. As the insert and receiver are pulled apart by the force of lifting the load, the tabs are forced into the depression. At this point, the load is secured and can be lifted and moved to another location. When the load is set down, the magnetic force causes the tabs to leave the depression and hit a second slope that pushes the tabs further rotationally, causing the tabs to align with an exit groove. At this point, the winch can pull the receiver up and it will detach from the insert. In this manner the insert and receiver are secured and released in a simple manner.

Figure 1:
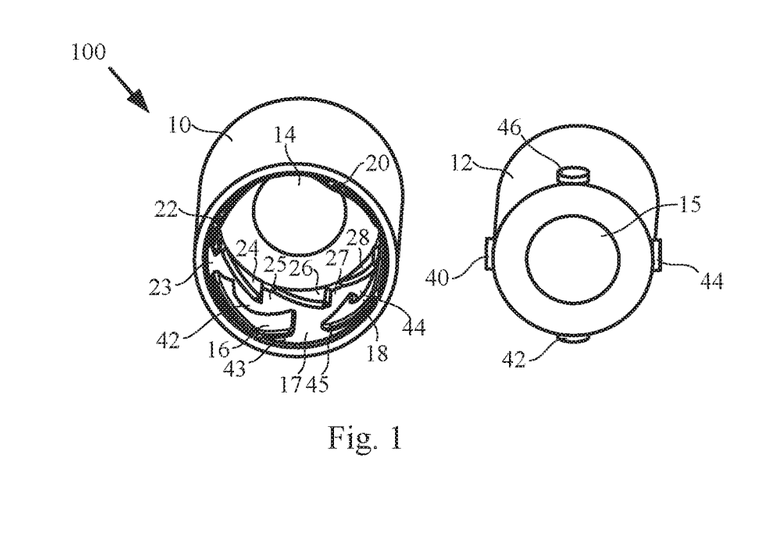
FIG. 1 is an isometric side end on view of a receiver and an insert.
Figure 2:
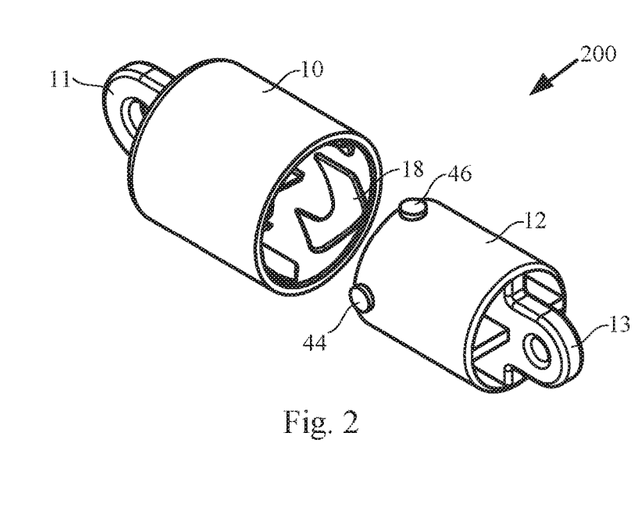
FIG. 2 is an isometric top side front view of the receiver and insert of FIG. 1, aligned to be connected.
Figure 3:
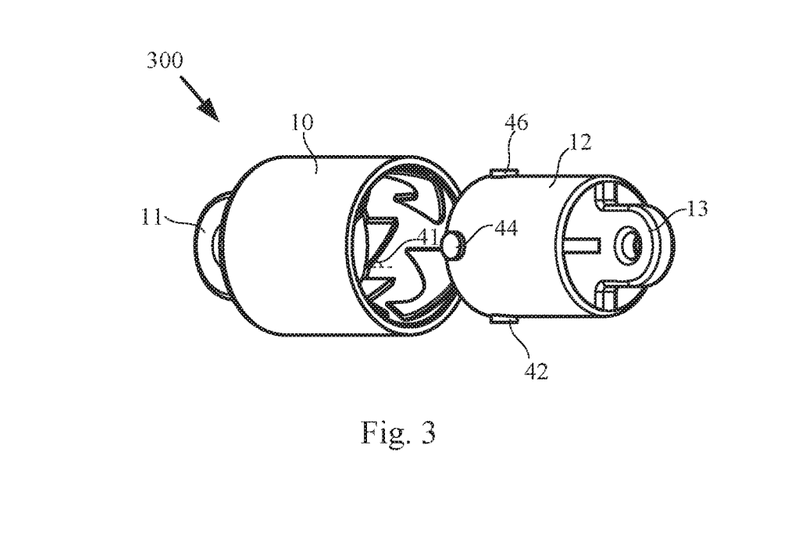
FIG. 3 is an isometric front side view of the receiver and insert of FIG. 1, aligned to be connected.
Figure 4:
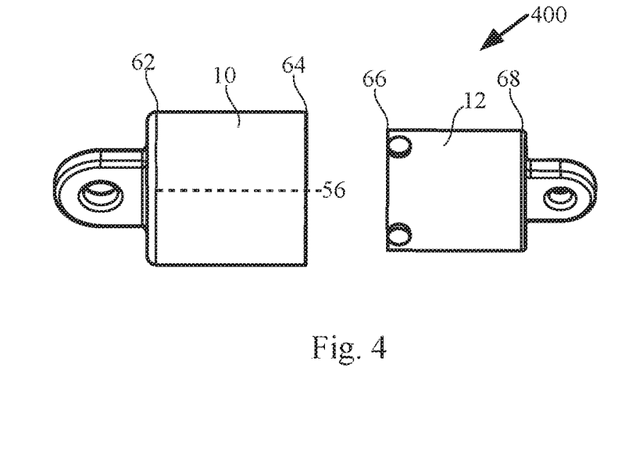
FIG. 4 is an elevation view of the receiver and insert of FIG. 1, aligned to be connected.

Now referring to the Figures, FIG. 1 is an isometric side end on view of a receiver and an insert, at 100, that may be used in one embodiment of the present invention. FIG. 2 is an isometric top side front view of the receiver and insert of FIG. 1 at 200, aligned to be connected. FIG. 3 is an isometric front side view of the receiver and insert of FIG. 1 at 300, aligned to be connected. FIG. 4 is an elevation view of the receiver and insert of FIG. 1 at 400, aligned to be connected. FIGS. 5A-E are cutaway, unrolled views of FIG. 4, cut along line 56, at 500, 501, 502, 503, and 504, of the interior of the receiver of FIG. 4 and the tabs of the insert of FIG. 4.

A receiver 10 consists of a first end 62, a second end 64, an eye 11, a first magnet 14, an RFID tag underneath the magnet, lower teeth 16, 18, 20, and 22, first upper teeth 26, 30, 34, and 38, and second upper teeth 24, 28, 32, and 36.

The spaces between the teeth are grooves for the tabs 40, 42, 44, and 46 to follow. There are four tab access portions that extend from points 17, 19, 21, and 23 to points 37, 25, 29, and 33, respectively. The tab access portions are open toward the second end of the receiver. There are four first inclined portions along the edge of first upper teeth 26, 30, 34, and 38 adjacent on one end to the tab access portion and adjacent on an other end to a tab capture portion. The four first inclined portions have an angle of inclination 41 of 45 degrees. There are four tab capture portions that extend from points 37, 25, 29, and 33 to points 54, 48, 50, and 52, respectively, and back to the tab access portions at points 39, 27, 31, and 35, respectively. There are four second inclined portions along the edge of the second upper teeth 24, 28, 32, and 36, adjacent on one end to the tab capture portion and adjacent on an other end to the tab access portion. The four second inclined portions also have an angle of inclination of 45 degrees. An insert 12 consists of a first end 68, a second end 66, an eye 13, a second magnet 15, and tabs 40, 42, 44, and 46. The eyes 11 and 13 may be attached to any two objects. A preferred embodiment has the receiver attached to a line attached to a lifting device, such as a winch, and the insert attached to a load to be lifted. The eyes 11 and 13 and the body of the insert 12 are not shown in FIGS. 5A-E for clarity. In this embodiment, a bottom side of the lower teeth 16, 18, 20, and 22 have third and fourth inclined portions which have an angle of inclination 43 of approximately 30 degrees and an angle of inclination 45 of approximately 30 degrees, respectively.

Figure 5A:
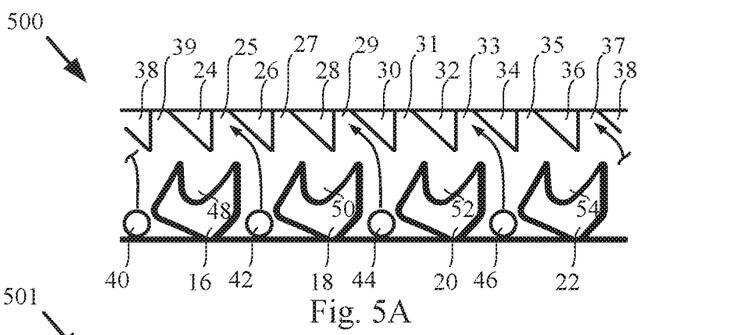
FIGS. 5A-E are a cutaway, unrolled view of the interior of the receiver of FIG. 4 and the tabs of the insert of FIG. 4.

At 500, the tabs 40, 42, 44, and 46 enter the grooves as the insert 12 and the receiver 10 are brought together by relative movement in a first linear direction. The relative movement in this embodiment is caused by attraction between the first magnet 14 and the second magnet 15. As the tabs 40, 42, 44, and 46 reach the first upper teeth 38, 26, 30, and 34, they ride in the first inclined portions, the first inclined portions causing a first step of relative rotation between the receiver 10 and the insert 12 in an angular direction, the tabs thereby being moved adjacent to the tab capture portions.

Figure 5B:
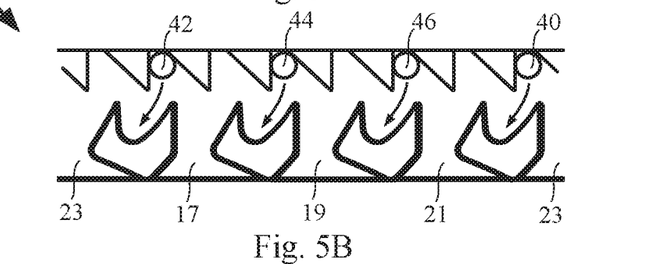
Figure 5C:
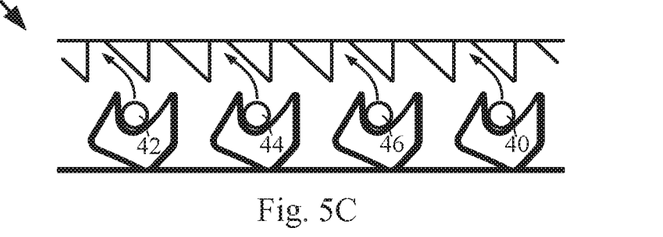
Figure 5D:
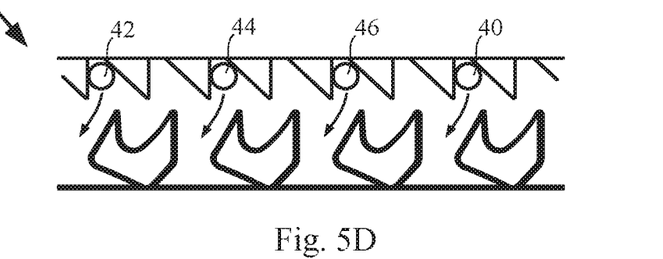
Figure 5E:
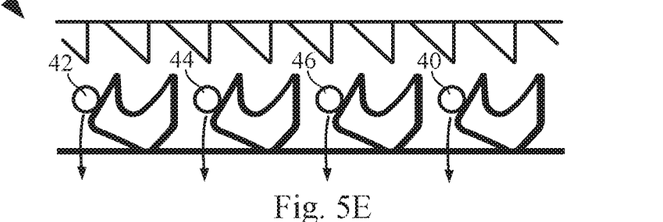

At 501, the receiver 10 is pulled away from the insert 12 with sufficient force to overcome the magnetic attraction and move the insert 12 and the receiver 10 in a second, opposite linear direction. This results in the tabs 40, 42, 44, and 46 entering the tab capture portions, where a sloped portion of the lower teeth 22, 16, 18, and 20 causes a second step of relative rotation between the receiver 10 and the insert 12 in the angular direction, until the tabs 40, 42, 44, and 46 are seated in the depressions in lower teeth 22, 16, 18, and 20, respectively, at points 54, 48, 50, and 52, respectively, as shown at 502.

At 502, the force pulling the receiver 10 from the insert 12 is removed and the magnetic attraction causes the insert 12 and the receiver 10 to move towards each other in the first linear direction. The tabs 40, 42, 44, and 46 leave the tab capture portions and ride along the second upper teeth 36, 24, 28, and 32, respectively, in the second inclined portions, causing a third step of relative rotation between the receiver and the insert in the angular direction, resulting in the tabs 40, 42, 44, and 46 entering the tab access portions. Applying another force to the receiver 10 relative to the insert 12 causes the insert 12 and the receiver 10 to separate in the second linear direction as the tabs 40, 42, 44, and 46 leave through the tab access portions.

Figure 6A:
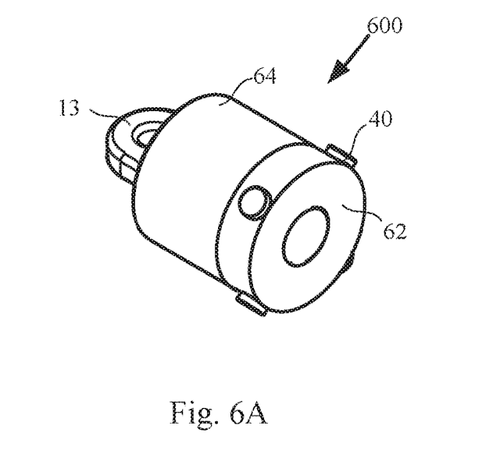
FIG. 6A is an isometric top side front view of an insert composed of two sections.
Figure 6B:
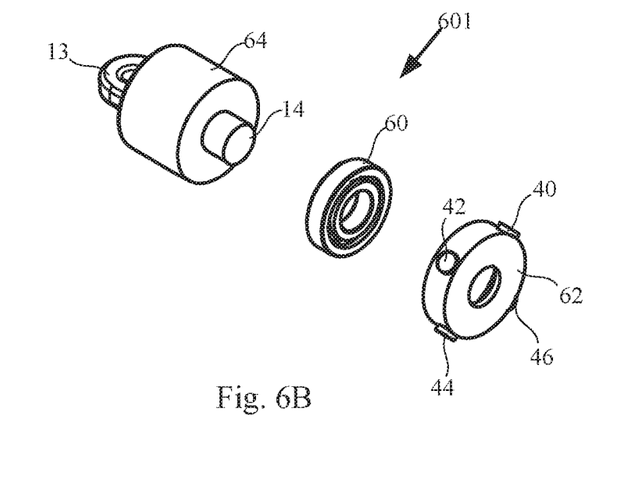
FIG. 6B is an isometric top side exploded view of the insert of FIG. 6A.
Figure 6C:
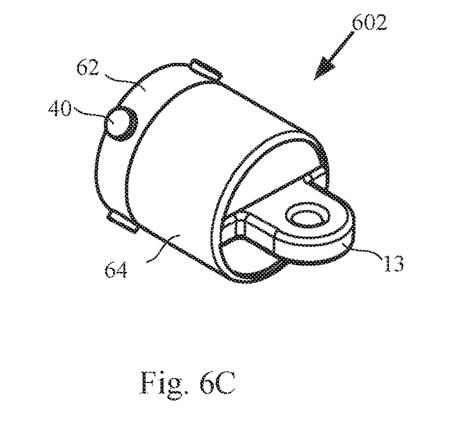
FIG. 6C is an isometric top side back view of the insert of FIG. 6A.
Figure 6D:
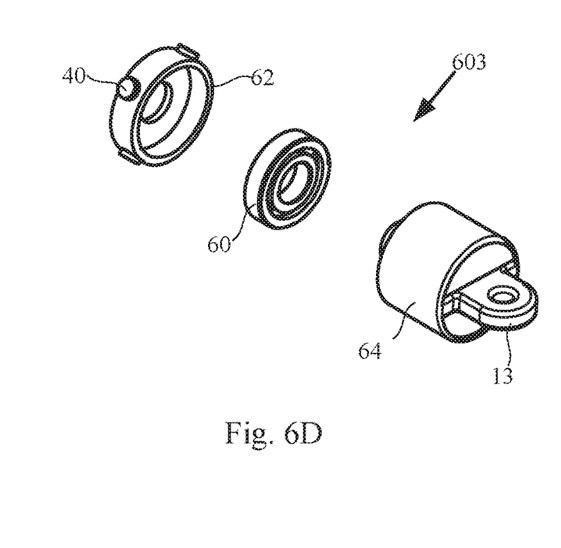
FIG. 6D is an isometric top side exploded view of the insert of FIG. 6C.

FIG. 6A is an isometric top side front view of an insert composed of two sections at 600 that may be used in one embodiment of the present invention. FIG. 6B is an isometric top side exploded view of the insert of FIG. 6A at 601. FIG. 6C is an isometric top side back view of the insert of FIG. 6A at 602. FIG. 6D is an isometric top side exploded view of the insert of FIG. 6C at 603. The insert, which could be used in place of insert 12 of FIGS. 1-5, has two main sections, leading end 62 and trailing end 64. They are each attached to radial ball bearings 60. This allows the insert leading end 62 to rotate in the first angular direction while the insert trailing end 64 remains fixed rotationally. Thereby, the object attached to the insert and the object attached to the receiver do not rotate relative to each other as the insert leading end 62 passes through the receiver. In other embodiments, the receiver contains the radial ball bearings.

Figure 7A:
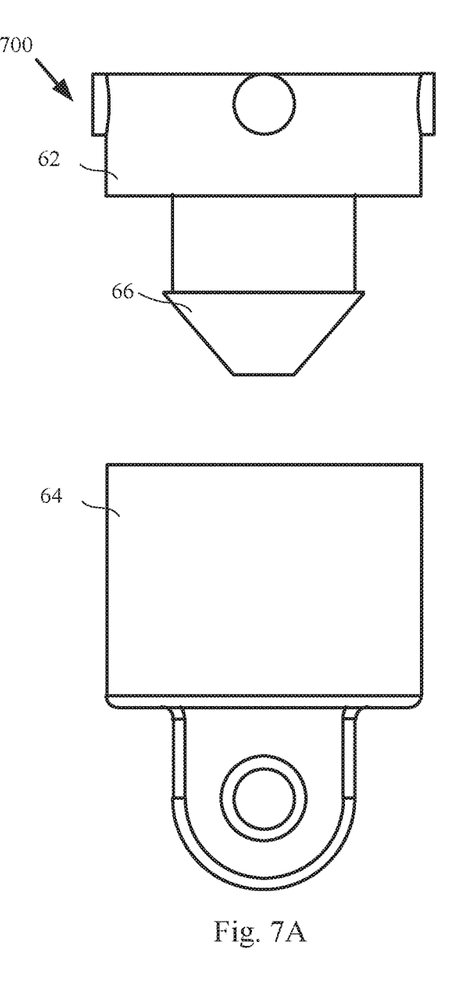
FIG. 7A is an elevation view of an insert composed of two sections.
Figure 7B:
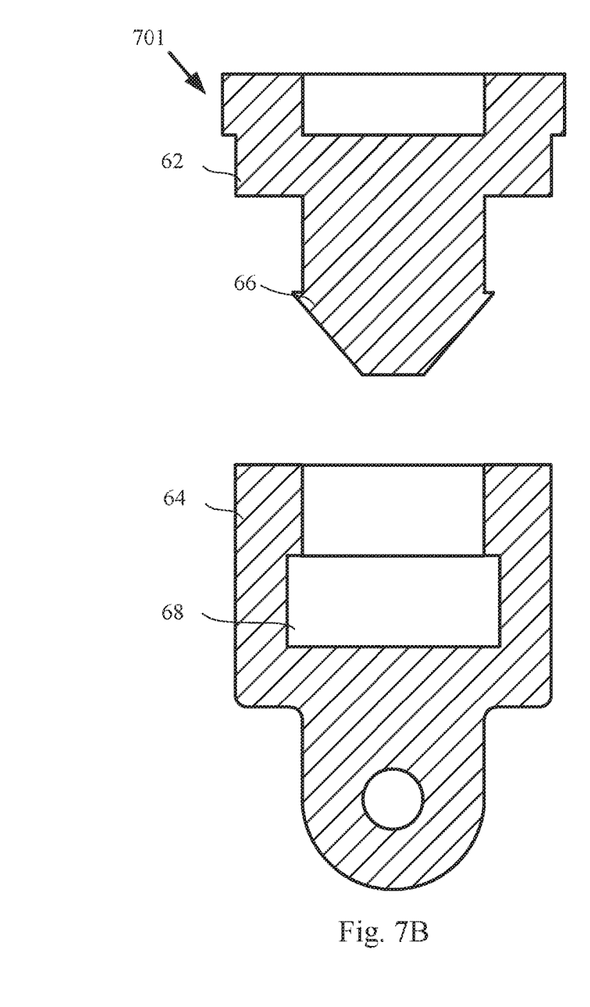
FIG. 7B is a cross-sectional elevation view of the insert of FIG. 7A.

FIG. 7A is an elevation view of an insert composed of two sections at 700 that may be used in one embodiment of the present invention. FIG. 7B is a cross-sectional elevation view of the insert of FIG. 7A. The insert, which could be used in place of insert 12 of FIGS. 1-5, has two main sections, leading end 62 and trailing end 64. They are attached by means of a push connection between a push insert 66 and a push receiver 68. This allows the insert leading end 62 to rotate in the first angular direction while the insert trailing end 64 remains fixed rotationally. Thereby, the object attached to the insert and the object attached to the receiver do not rotate relative to each other as the insert leading end 62 passes through the receiver. In other embodiments, the receiver is split into two parts as per FIG. 7.

Figure 8:
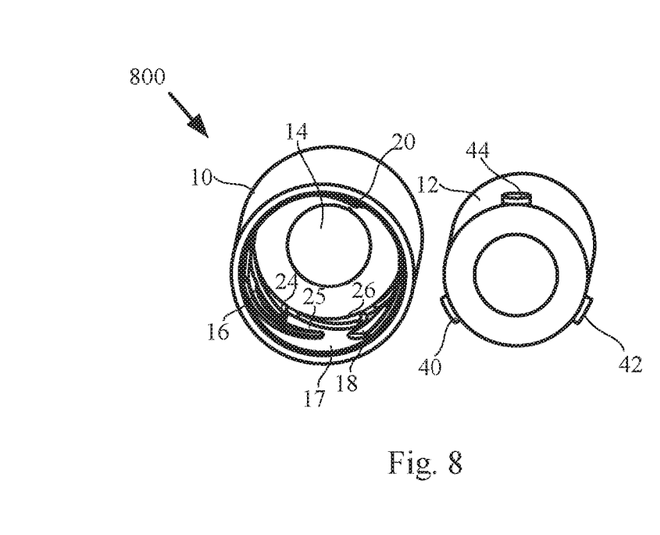
FIG. 8 is an isometric side end on view of a receiver and an insert.
Figure 9:
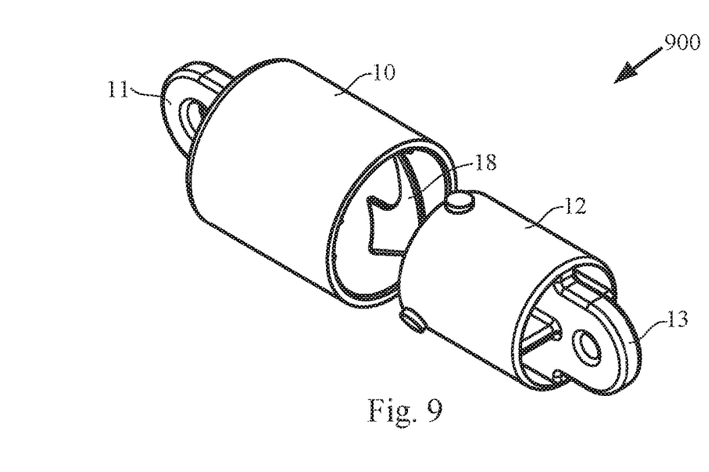
FIG. 9 is an isometric top side front view of the receiver and insert of FIG. 8, aligned to be connected.
Figure 10:
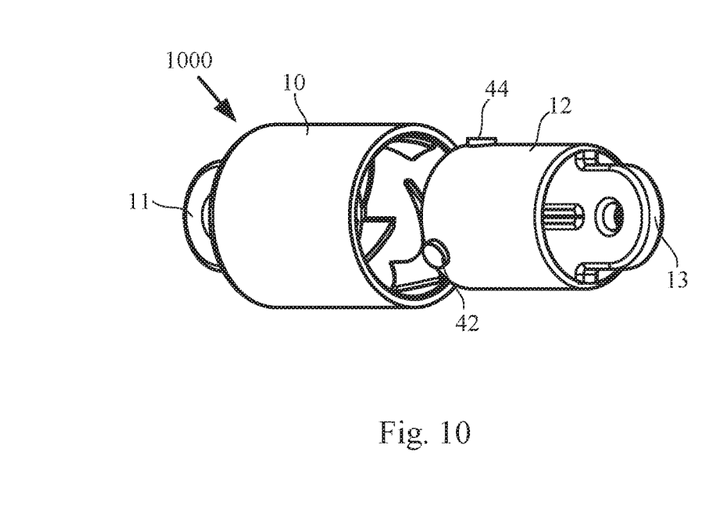
FIG. 10 is an isometric front side view of the receiver and insert of FIG. 8, aligned to be connected.
Figure 11:
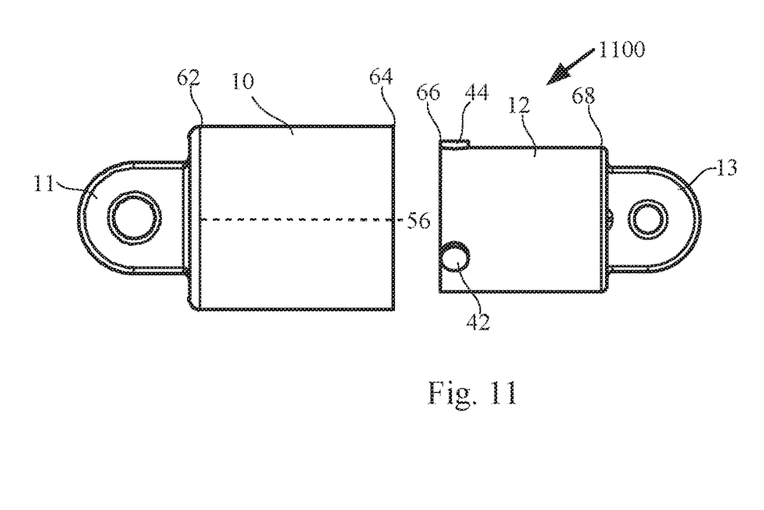
FIG. 11 is an elevation view of the receiver and insert of FIG. 8, aligned to be connected.
Figure 12:
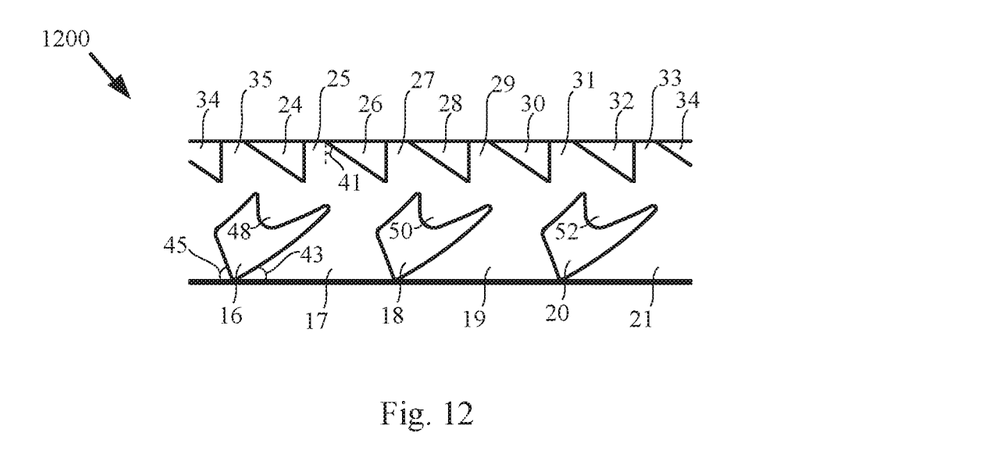
FIG. 12 is a cutaway, unrolled view of the interior of the receiver of FIG. 11.

FIG. 8 is an isometric side end on view of a receiver and an insert, at 800, that may be used in one embodiment of the present invention. FIG. 9 is an isometric top side front view of the receiver and insert of FIG. 8 at 900, aligned to be connected. FIG. 10 is an isometric front side view of the receiver and insert of FIG. 8 at 1000, aligned to be connected. FIG. 11 is an elevation view of the receiver and insert of FIG. 8 at 1100, aligned to be connected. The insert and receiver of FIGS. 8 through 11 are a 3 tab version of the insert and receiver of FIGS. 1-5 and consistent numbering will be used. FIG. 12 is a cutaway, unrolled view of FIG. 11, cut along line 56, at 1200, of the interior of the receiver of FIG. 11.

A receiver 10 consists of a first end 62, a second end 64, an eye 11, a first magnet 14, lower teeth 16, 18, and 20, first upper teeth 26, 30, and 34, and second upper teeth 24, 28, and 32. The spaces between the teeth are grooves for the tabs 40, 42, and 44 to follow. There are three tab access portions that extend from points 17, 19, and 21 to points 25, 29, and 33, respectively. The tab access portions are open toward the second end of the receiver. There are three first inclined portions along the edge of first upper teeth 26, 30, and 34 adjacent on one end to the tab access portion and adjacent on an other end to a tab capture portion. The three first inclined portions have an angle of inclination 41 of 35 degrees. There are three tab capture portions that extend from points 25, 29, and 33 to points 48, 50, and 52, respectively, and back to the tab access portions at points 35, 27, and 31, respectively. There are three second inclined portions along the edge of the second upper teeth 24, 28, and 32, adjacent on one end to the tab capture portion and adjacent on an other end to the tab access portion. The three second inclined portions also have an angle of inclination of 35 degrees. An insert 12 consists of a first end 68, a second end 66, an eye 13, a second magnet 15, and tabs 40, 42, and 44. The eyes 11 and 13 may be attached to any two objects. The eyes 11 and 13 and the body of the insert 12 are not shown in FIG. 12 for clarity. In this embodiment, a bottom side of the lower teeth 16, 18, 20, and 22 have third and fourth inclined portions which have an angle of inclination 43 of approximately 38 degrees and an angle of inclination 45 of approximately 76 degrees, respectively.

In some embodiments, the first inclined portions have an angle of inclination of at least 30 degrees. In some embodiments, the third and fourth inclined portions each have an angle of inclination of at least 30 degrees.

In other embodiments, the number of tabs may be 5 or more.

Figure 13:
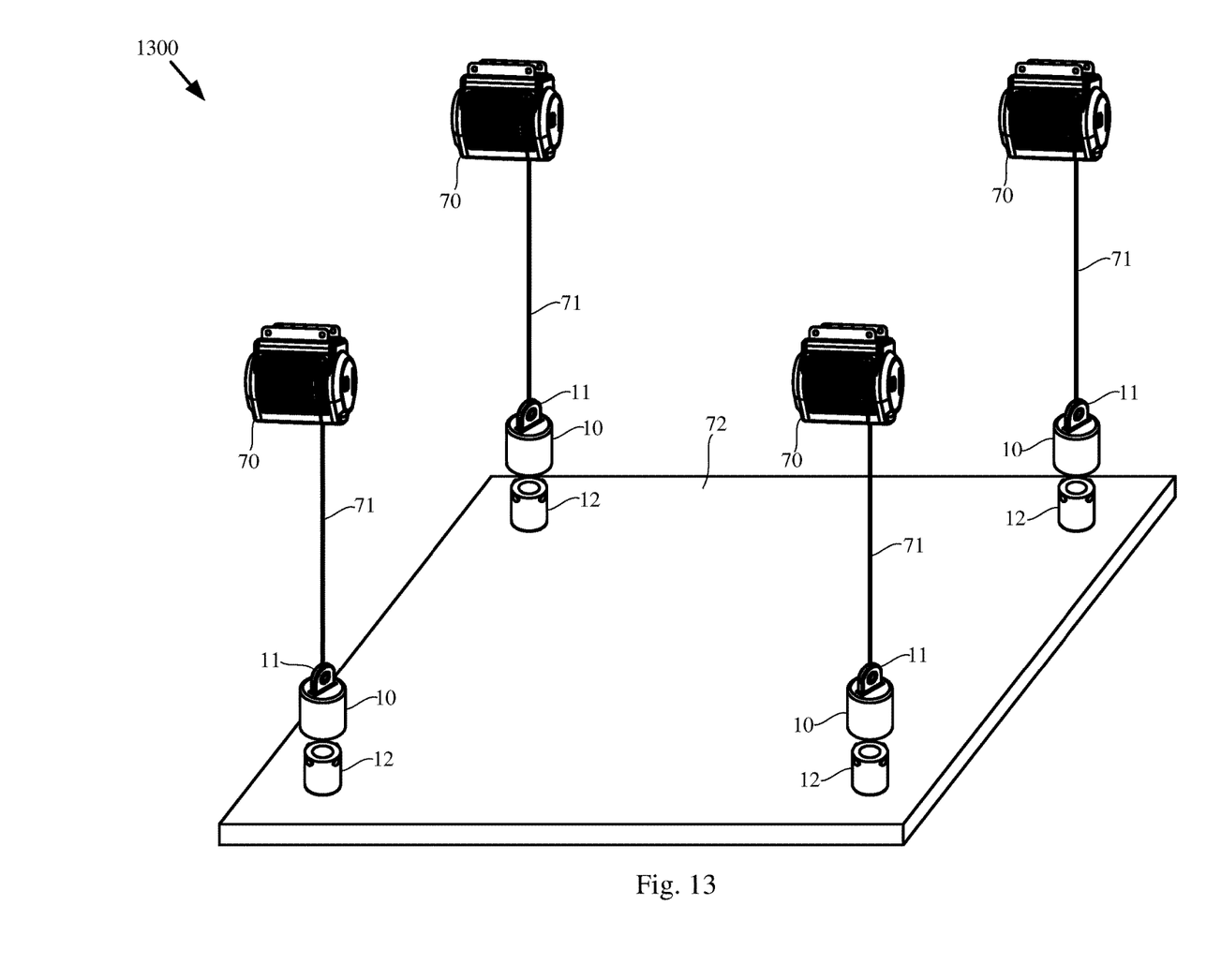
FIG. 13 is an isometric top front view of lifters attached to receivers hanging above inserts attached to a platform.

FIG. 13 is an isometric top front view of lifters attached to receivers hanging above inserts attached to a platform at 1300, that may be used in one embodiment of the present invention. The preferred lifters to use with the present invention are those sold by Garage Smart under the name MyLifter®. Various features of these lifters are disclosed in U.S. Pat. Nos. 9,567,195; 9,598,269; and 9,624,076, the entire disclosures of which are incorporated herein by reference.

These preferred lifters have four important features. First, the lifters can be controlled remotely, for example by a smart phone running an app. Second, the lifters "talk" to each other. As a result, the group of lifters, preferably 4, can ensure that the lifting and lowering is synchronized, i.e. that all four corners are lifted and lowered at the same rate. Third, each lifter can sense whether there is a load on its cable or not. In this way, if, for some reason, the connection is not made; that particular lifter can repeat the connection cycle until the load is connected, while the other lifters that did make a connection maintain that connection. Fourth, the winding and unwinding of the cable on these lifters can be precisely controlled. As a result, the cables can be lowered to a point and stopped just above where the inserts and receivers connect, so as to allow the magnets in each to attract one another. After this pause, the cables can be let down to the point where the inserts and receivers actually connect.

Figure 14:
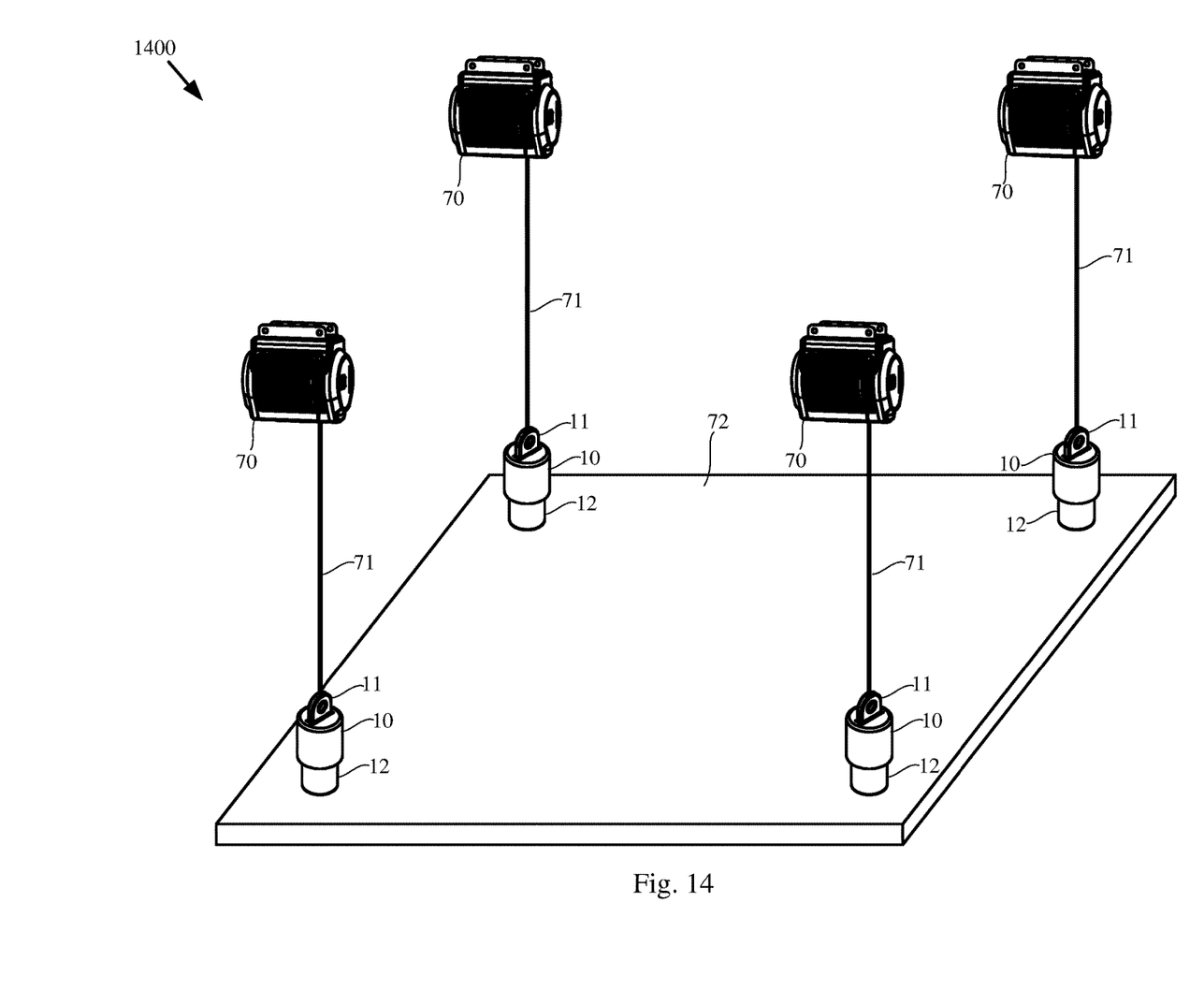
FIG. 14 is an isometric top front view of the system of FIG. 13, where the receivers are attached to the inserts.

FIG. 14 is an isometric top front view of the system of FIG. 13, where the receivers are attached to the inserts at 1400. Inserts 12 and receivers 10 are the same as those detailed in FIGS. 1-5. Platform 72 has four inserts 12 attached at the four corners of the platform 72. In a preferred embodiment, the inserts are located within wells, formed in the platform, so as not to protrude from the surface of the platform.

In order to lift platform 72, four smart lifters 70 with lines 71 are provided, each with a receiver 10 attached to the line by an eye 11. The four receivers 10 are lowered onto the four inserts 12 by a method detailed below. Once attached, the four receivers 10 lift the four inserts 12, thereby lifting the platform 72. The smart lifters 70 move the platform 72 to a new location or return it to the same location when desired. The act of setting down the platform 72 causes the magnets 14 and 15 to draw together, aligning the receivers 10 to detach from the inserts 12 when the smart lifters retract the lines 71.

Attachment of the receivers 10 to the inserts 12 is accomplished by means of smart lifters 70. The smart lifters 70 contain load detectors that determine when a load is present on line 71. To attach the receivers 10 to the inserts 12, the receivers 10 move above the inserts 12 and lower the receivers 10 to within a short distance of the inserts 10. In a preferred embodiment, this is about ⅛". In other embodiments, the distance is close enough that magnets 14 and 15 attract each other. The receivers 10 will be swinging slightly when moved, with the swinging lasting a relatively long time. However, magnets 14 and 15 cause the receivers 10 and the inserts 12 to be attracted to each other. The attraction dampens the swinging motion and aligns the receivers 10 and the inserts 12 within a relatively short time.

The receivers 10 can then be lowered onto the inserts 12 and align, as described regarding FIGS. 1-5.

Verification of proper attachment is accomplished by the load detectors. As each load detector in the smart lifters 70 determines that the receiver 10 and the insert 12 are properly connected, determined because there is a load present when properly connected, the platform 72 can be lifted evenly. Without proper alignment, the platform 72 could be lifted by fewer than all four of the smart lifters 70.

Verification of proper detachment is also accomplished by the load detectors. As the platform 72 is set down, the magnets 14 and 15 cause the insert 12 to rotate in the receiver 10 to a position that the receiver will detach when again pulled upward by the smart lifter 70. However, if something occurs causing the alignment to not rotate properly, when the smart lifter 70 pulls on the receiver 10, the tabs of the insert 12 will again catch in their capture positions in the receiver 10, and the load detector will determine there is a load on that receiver 10. The smart lifter 70 will again lower the line to release the load, giving the receiver 10 and the insert 12 another chance to align properly for detachment. This can be repeated automatically until the insert 12 and the receiver 10 are detached.

Once all of the inserts and receivers are detached, the lifters wind up the lines, so they do not hang down into the room when not in use. However, if any of the lifters detect that an insert and receiver are not detached when they are supposed to be, the lifters are prevented from lifting the cables, to thereby avoid lifting just one or two corners of a platform and a potential catastrophic failure of the system.

In some embodiments, the insert contains an RFID tag. An RFID locator is configured to determine the location of the RFID tag and transmits the location to a controller. The controller is configured to move the lifting device attached to the receiver such that the receiver aligns with the insert.

The invention has been described with reference to various specific and preferred embodiments and techniques. Nevertheless, it is understood that many variations and modifications may be made while remaining within the spirit and scope of the invention.

What is claimed is:

1. A device for releasably securing a first object and a second object comprising:
   an insert with a first end attachable to the first object and a generally cylindrical second end comprising at least two tabs extending radially from the second end;
   a receiver with a first end attachable to the second object and a second end comprising a cavity for receiving the insert, the cavity comprising a generally cylindrical wall, the wall comprising a groove for receiving the at least two tabs;
   wherein the groove comprises:
   at least two tab access portions, open toward the second end of the receiver, whereby the tabs enter the groove as the insert and the receiver are brought together by relative movement in a first linear direction;
   at least two tab capture portions, wherein each of the tab capture portions is separated by one of the at least two tab access portions;
   at least two first inclined portions, each first inclined portion adjacent on one end to a tab access portion and adjacent on an other end to one of at the least two tab capture portions, whereby, as the insert and the receiver are brought together by relative movement in the first linear direction, tabs riding in one of the first inclined portions cause a first step of relative rotation between the receiver and the insert in an angular direction, and whereby, as a result of the first step of relative rotation, the tabs having entered the groove through the tab access portion are moved adjacent to the tab capture portions, to thereby secure the first and second objects;

wherein the at least two tab capture portions each comprise a second inclined portions, whereby as the insert and the receiver are moved apart by relative movement in a second and opposite linear direction, each tab is caused to take a second step of relative rotation between the receiver and the insert in the angular direction along the second inclined portion, whereby, as a result of the second step of relative rotation, the tabs are aligned with a second inclined portion and are captured in a tab capture portion, the tab capture portion preventing the insert and receiver from separating;

at least two third inclined portions, each third inclined portion adjacent on one end to a tab capture portion and adjacent on an other end to a tab access portion, whereby as the insert and the receiver are moved together by relative movement in the first linear direction, each tab rides in one of the third inclined portions and causes a third step of relative rotation between the receiver and the insert in the angular direction, and whereby as a result of the third step of relative rotation, the tabs are moved out of the tab capture portions to the tab access portions, to thereby release the first and second objects upon relative movement between the insert and the receiver in the second linear direction;

wherein the at least two tabs are radially spaced on the second end of the insert so as to simultaneously line up with either tab access portions or tab capture portions; and a first magnet in the second end of the insert and a second magnet in the receiver located within the cavity adjacent the first end of the receiver, the first magnet and the second magnet attracting each other and causing relative movement in the first linear direction.

2. The device of claim 1, wherein the insert or the receiver comprise a first part and a second part each attached to radial ball bearings such that the first object and the second object remain stationary rotationally as the tabs rotate relative to the receiver.

3. The device of claim 1, wherein the insert or the receiver comprise a first part and a second part, the first part having a fitting configured to fit into the second part such that the fitting remains attached when the first part and the second part are pulled in opposite directions and configured to rotate freely such that the first object and the second object remain stationary rotationally as the tabs rotate relative to the receiver.

4. The device of claim 1, wherein the insert comprises an RFID tag.

5. The device of claim 4, further comprising an RFID locator configured to determine the location of the RFID tag and transmit the location to a controller, the controller configured to send instructions to a lifting device attached to the receiver to move the receiver to align with the insert.

6. The device of claim 1, wherein the at least two first inclined portions, the at least two second inclined portions, and the at least two third inclined portion, have angles of inclination of at least 30 degrees.

7. The device of claim 1, wherein an opening of the at least two tab access portions to the second end of the receiver comprise at least two third inclined portions that direct the at least two tabs into the two tab access portions.

8. The device of claim 7, wherein the at least two third inclined portions have angles of inclination of at least 30 degrees.

9. A system for raising and lowering a load comprising:

an insert with a first end configured to attach to the load, and a generally cylindrical second end comprising at least two tabs extending radially outwardly from the second end, and a first magnet;

a receiver with a first end configured to attach to the load or the line and a second end comprising a cavity configured to receive the insert, the cavity comprising a generally cylindrical wall, the wall comprising a groove configured to receive the tabs, and the receiver further comprising a second magnet within the cavity adjacent to the first end of the receiver that attracts the first magnet;

wherein the groove comprises:

at least two tab access portions, open toward the second end of the receiver, whereby the tabs enter the groove as the insert and the receiver are brought together by relative movement in a first linear direction caused by the attraction between the first magnet and the second magnet;

at least two first inclined portions, each first inclined portion adjacent on one end to a tab access portion and adjacent on an other end to a tab capture portion, whereby, as the insert and the receiver are brought together by relative movement in the first linear direction, tabs riding in one of the first inclined portions cause a first step of relative rotation between the receiver and the insert in an angular direction, and whereby, as a result of the first step of relative rotation, the tabs having entered the groove through the tab access portion are moved adjacent to the tab capture portions, to thereby secure the first and second objects;

at least two tab capture portions comprising at least two second inclined portions, whereby as the insert and the receiver are moved apart by relative movement in a second and opposite linear direction by the lifting device pulling the load, each tab is caused to take a second step of relative rotation between the receiver and the insert in the angular direction along the second inclined portion, whereby, as a result of the second step of relative rotation, the tabs are aligned with a second inclined portion and are captured in a tab capture portion, the tab capture portion preventing the insert and receiver from separating, wherein each of the tab capture portions is separated by one of the at least two tab access portions; and at least two third inclined portions, each third inclined portion adjacent on one end to a tab capture portion and adjacent on an other end to a tab access portion, whereby as the insert and the receiver are moved by relative movement in the first linear direction by the lifting device releasing tension on the load and the first magnet and the second magnet pulling the insert and the receiver together, each tab rides in one of the second inclined portions and causes a third step of relative rotation between the receiver and the insert in the angular direction, and whereby as a result of the third step of relative motion, the tabs are moved out of the tab capture portions to the tab access portions, to thereby release the load upon again moving the receiver in the second linear direction by the lifting device pulling on the insert or the receiver;

wherein the at least two tabs are radially spaced on the second end of the insert so as to simultaneously line up with either tab access portions or tab capture portions; and wherein the load is attached to a lifter, which lifter is configured to lower the load to the point where the receiver is aligned with the insert and a connection is made therebetween, and to raise the load once the connection is made.

10. The system of claim 9, wherein the lifter is configured to lower the load to the point where the insert and receiver become detached and configured to thereafter raise the detached line out of sight.

11. The system of claim 9, wherein the load is a rectangular platform;

wherein the insert is a first insert associated with a first corner of the platform;

wherein the receiver is a first receiver associated with the first corner of the platform;

wherein is a first line is associated with the first corner of the platform;

wherein the lifter is a first lifter associated with the first corner of the platform; and wherein the system further comprises a second, third and fourth insert similar to the first insert and associated with a second third and fourth corner of the platform, respectively;

a second, third and fourth receiver similar to the first receiver and associated with the second third and fourth corner of the platform, respectively;

a second, third and fourth line similar to the first line and associated with the second third and fourth corner of the platform, respectively;

a second, third and fourth lifter similar to the first lifter and associated with the second third and fourth corner of the platform, respectively.

12. The system of claim 11 wherein the first, second, third and fourth lifters are configured to ensure synchronized raising and lowering of the first, second, third and fourth corners of the platform.

13. The system of claim 11 wherein the first, second, third and fourth lifters are each configured to detect whether a load is attached or detached.

14. The system of claim 13 wherein the first, second, third and fourth lifters are prevented from raising the platform unless every one of the first, second, third and fourth lifters detect the load being attached.

15. The system of claim 11 wherein the first, second, third and fourth lifters are configured to detect whether a load is attached or detached and, if one or more of the first, second, third and fourth lifters detects the load is detached when it should be attached, that one of the first, second, third and fourth lifter is configured to lower its line again to attempt attachment.

16. The system of claim 11 wherein the platform supports a piece of furniture and wherein the system facilitates conversion of a multi-purpose space.

17. The system of claim 11 wherein the platform supports an appliance and wherein the system facilitates conversion of a multi-purpose space.

18. The system of claim 11 wherein the platform is raised to a point at or above a ceiling of a multi-purpose space and is lowered to a point at or near a floor of the multi-purpose space.

19. The system of claim 9, wherein the insert comprises an RFID tag and further comprising an RFID locator configured to determine the location of the RFID tag and transmit the location to a controller, the controller configured to move the lifting device such that the receiver aligns with the insert.

* * * * *